US005351292A

United States Patent [19]

Lindholm

[11] Patent Number: 5,351,292

[45] Date of Patent: * Sep. 27, 1994

[54] METHOD AND APPARATUS FOR PREVENTING EXTERNAL DETECTION OF SIGNAL INFORMATION

[75] Inventor: Per Lindholm, Stockholm, Sweden

[73] Assignee: Cominvest Research AB, Stockholm, Sweden

[ * ] Notice: The portion of the term of this patent subsequent to Oct. 20, 2009 has been disclaimed.

[21] Appl. No.: 944,427

[22] Filed: Sep. 14, 1992

Related U.S. Application Data

[63] Continuation of Ser. No. 721,632, Sep. 23, 1991, Pat. No. 5,157,725.

[30] Foreign Application Priority Data

Jan. 26, 1989 [SE] Sweden .............................. 8900288-5

[51] Int. Cl.[5] .............................................. H04L 9/00

[52] U.S. Cl. .......................................... 380/10; 380/9; 380/49

[58] Field of Search ................................ 380/9, 10, 49

[56] References Cited

U.S. PATENT DOCUMENTS

| | | | |
|---|---|---|---|
| 4,225,962 | 9/1980 | Meyr et al. | 380/49 |
| 4,563,546 | 1/1986 | Glitz | 380/49 |
| 5,157,725 | 10/1992 | Lindholm | 380/49 |
| 5,165,098 | 11/1992 | Hoivik | 380/49 |

FOREIGN PATENT DOCUMENTS

| | | | |
|---|---|---|---|
| 0240328 | 10/1987 | European Pat. Off. | G06F 1/00 |

OTHER PUBLICATIONS

Smiley, C. R., "Exchange data between digital systems", *Electronic Design,* vol. 25, No. 9, Apr., 1977, pp. 96–98.

Marshall, R. C., "Radio-Frequency Emission From VDUS", *The Computer Law and Security Report,* vol. 1, No. 3, 1985, pp. 4–5.

Nachtmann, L., "Moderne Datenspionage-Abhoren von Computern", *Chip,* No. 11, Nov. 1986, pp. 252, 254.

*Primary Examiner*—Salvatore Cangialosi

*Attorney, Agent, or Firm*—Cushman Darby & Cushman

[57] ABSTRACT

In a method and an apparatus for preventing external detection of the signal information in video signals occurring in, and being emitted from, video signal circuits in a display unit, or a similar unit, and including substantially consecutive frame or field signals, each constituted by substantially consecutive line signals, a phantom signal in the form of at least one pseudo-random bit signal sequence with properties similar to those of the video signals is emitted in addition to the video signals. A generator for generating the phantom signal is connected to an external power supply line to the unit containing the video signal circuits, for output of the phantom signal on this line. Using a control unit, the bit frequencies of the pseudo-random bit signal sequence/sequences are varied. Furthermore, the pseudo-random bit signal sequence/sequences are formed of a number of part signal sequences with a duration varying from one frame or field period to another.

14 Claims, 5 Drawing Sheets

METHOD AND APPARATUS FOR PREVENTING EXTERNAL DETECTION OF SIGNAL INFORMATION

This is a continuation of application Ser. No. 721,632 filed Sep. 23, 1991, now U.S. Pat. No. 5,157,725.

BACKGROUND OF THE INVENTION

The present invention relates to a method and an apparatus for preventing external detection of signal information in video signals occurring in, and being emitted from, a display unit, or a similar unit, and comprising substantially consecutive frame or field signals, each consisting of substantially consecutive line signals.

Display units are widely used as components in, for example, data processing systems in which confidential information is processed and stored, and also in similar units, such as matrix printers. The video signals occurring in these units and containing components of radio frequency, are emitted therefrom and can be intercepted distantly from the display unit itself. By such detection, the information can comparatively easily be displayed on another display unit. Since it is important, both from commercial and legal standpoints, that such information does not leak, efforts have been made to either reduce the emission or alter it in such a manner that detection of the information is rendered more difficult or even impossible.

It is known to reduce the emission of video signals by encapsulating or shielding the equipment at issue, such that the signal strength of the emitted signals becomes too low to be detected. This, however, is a very expensive solution.

It is also known to emit an interfering signal in the form of white noise around the equipment, which renders the interception more difficult, but it is nevertheless possible to detect the video signal information by using advances computer analysis. Furthermore, this technique may create more problems than it solves, since the requires noise signals may exceed the standards of radio interference other adjacent equipment is knocked out.

It is, moreover, known to emit, instead of white noise, an interfering signal with properties similar to those of the video signals. Thus, existing radio interference standards can be maintained, while the detection of video signal information is rendered very difficult.

In the methods of the type mentioned by way of the introduction, it is thus previously known to emit a phantom signal in the form of at least one pseudo-random bit signal sequence with properties similar to those of the video signal.

Apparatuses for carrying out these methods comprise a generator for generating the phantom signal, and an aerial for emitting the phantom signal from the generator.

SUMMARY OF THE INVENTION

A first object of the present invention is to further improve the methods and the apparatuses of the type mentioned by way of the introduction to prevent, in actual practice, any type of external detection of the signal information in the video signals.

According to the present invention, external detection of the signal information in the video signals may be rendered even more difficult if the phantom signal is also supplied on an external power supply line to the unit containing the video signal circuits.

Although the video signal circuits are, conventionally, separated from the power supply line by means of a low-pass filter, the video signals can nevertheless be transmitted to the power supply line, e.g. a mains connection, and the signal information in the video signals may thus be detected on, for example, external lines connected to the power supply line. For lower frequencies, the power supply line may also serve as a part of the emitting construction if the power supply filtration of the display unit is insufficient, which is extremely common in commercial data terminal equipment. Thus, the video signals may be emitted from the power supply line.

With the method according to the invention, it is no longer possible to detect the signal information in the video signals because of a cascade connection of power supply filters. Thus, the video signals are filtered twice, while the phantom signal is only filtered once, such that the effect of the video signals is reduced to a fraction of that of the phantom signal.

An apparatus suitable for carrying out the method according to the invention may be characterised in that the generator for generating the phantom signal is also connected to the external power supply line to the unit containing the video signal circuits, for outputting the phantom signal on this line.

A second object of the invention is to produce a phantom signal which, compared with prior art techniques renders detection of the information in the video signals even more difficult.

To be precise, two things are required for detecting the information in the video signals. Firstly, it has to be possible to synchronise the detection circuits with the video signals; secondly, it has to be possible to process the detected, sychronised video signals in such a manner that the information content is decoded.

A third object of the invention is, therefore, to produce a phantom signal which makes synchronisation and decoding of the video signals more difficult.

According to a second aspect of the invention, this is achieved in a method of the type described by way of the introduction in that the bit frequencies of the pseudo-random bit signal sequence/sequences are varied. In the apparatus according to the invention for carrying out said method, a control unit is used for varying the bit frequency of the pseudo-random bit signal sequence/sequences.

Suitably, the bit frequency/frequencies are varied with a frequency of at least about the same order of magnitude as the line frequency of the video signals.

Furthermore, the bit frequency or frequencies should differ from, but be of the same order of magnitude as the pixel frequency of the video signals.

To make the decoding of the video signals even more difficult, the pseudo-random bit signal sequence/sequences may be advantageously formed of a number of part signal sequences, the duration of which varies from one frame or field period to another. For this purpose, the pseudo-random generator in the apparatus according to the invention may be a maximum recurrence length shift register with adjustable maximum length.

Moreover, the phantom signal should be emitted with substantially the same intensity in all directions, so as to avoid making it easier to detect the information in the video signals in any particular direction. In the case of several pseudo-random bit signal sequences, this can more easily be achieved with one aerial than with a number of aerials located at a distance from one another, because a circuit combining the pseudo-random bit signal sequences may, according to the invention, be advantageously connected between the generator and the aerial.

If the apparatus according to the invention forms a separate unit connectible to an existing display unit or a similar unit, the aerial advantageously comprises two aerial members, one of which has the form of a broadening fin outwardly projecting from one side of a ground plane and having surfaces perpendicular to one another and to said ground plane, while the other member is a dipole arranged circularly around the fin in a plane parallel to the ground plane.

The apparatus according to the invention may, however, also form part of the display unit or another unit containing the video signal circuits, in which case the aerial may comprise a conductor in a line conducting the video signals to the display unit; or one or more conductors preferably disposed along the line through which the video signals pass to, for example, the display unit; or a balanced transmission line preferably disposed along said video signal-conducting line; or a coaxial line also preferably disposed along said video signal-conducting line and emitting the phantom signal.

Finally, it should be pointed out that the maximum effect of the invention is achieved by combining the different aspects of the invention described above.

BRIEF DESCRIPTION OF THE DRAWINGS

The invention will be described in more detail below, reference being made to the accompanying drawings, wherein.

DETAILED DESCRIPTION

Figure 1:
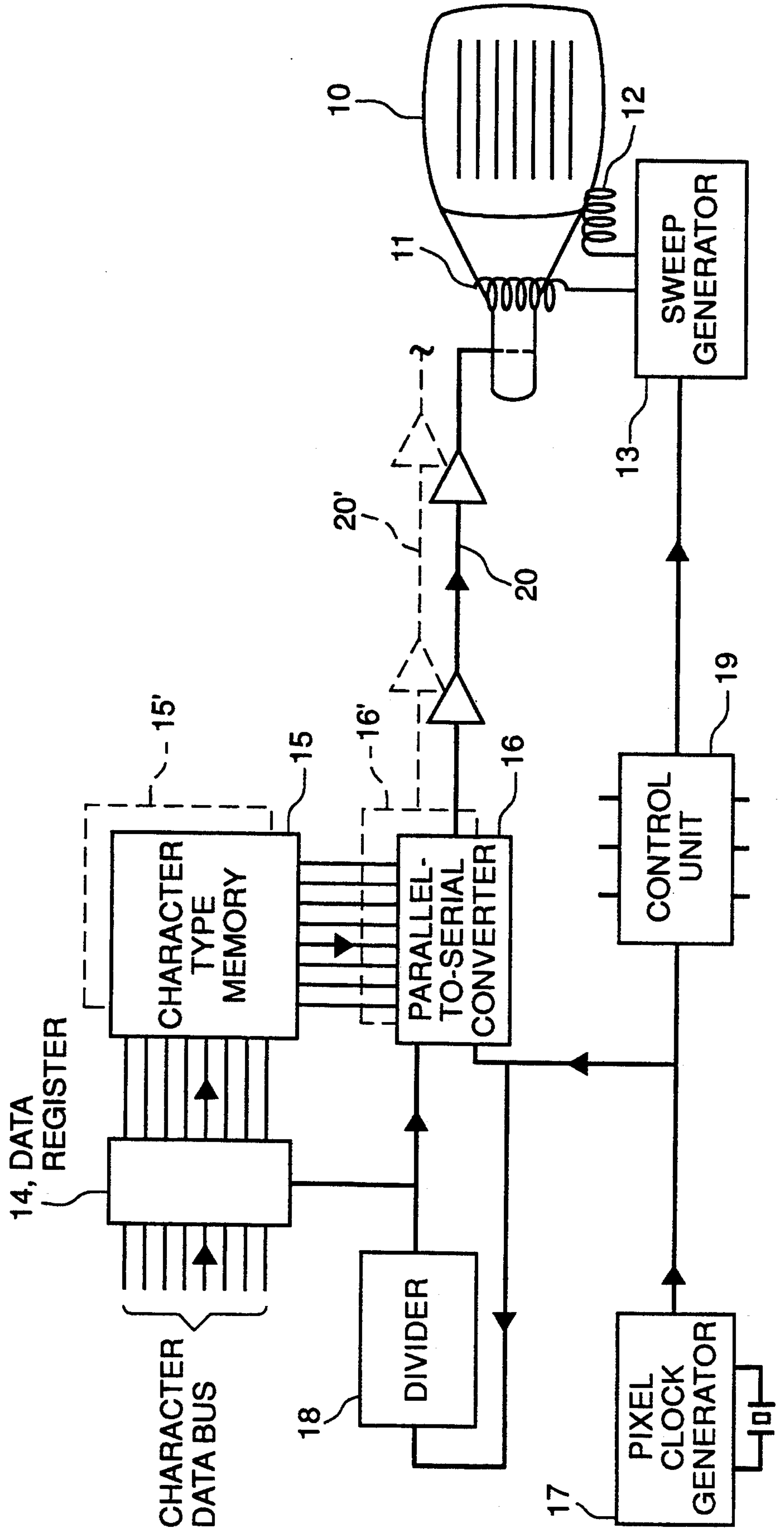
FIG. 1 is a block diagram showing a conventional display unit with associated circuits.

The conventional display unit shown in FIG. 1 comprises a cathode ray tube 10 with deflection yokes 11, 12 and a sweep generator 13. On the input side, the display unit comprises a data register 14, a character type memory 15, and a parallel-to-serial converter 16. A pixel clock generator 17 is connected, via a divider 18, to the data register 14, as well as to the converter 16, and is, furthermore, directly connected to the latter. A display control unit 19 is also directly connected to the output of the generator 17, as well as to the sweep generator 13 for control thereof.

On a character data bus, the data register 14 receives data concerning the characters to be shown on the display unit and transfers these data to the character type memory 15 which, for every character line to be shown on the display unit, generates a consecutive sequence of parallel bit signals which, one by one, are fed to the parallel-to-serial converter 16. For every line made by the sweep generator 13 on the display unit 10, the parallel-to-serial converter 16 emits a bit signal sequence with a bit configuration corresponding to the parts in question of the characters of the character line. This output signal from the parallel-to-serial converter 16 is fed, via an amplifier, to the cathode ray tube 10 for intensity modulation of its electron beam.

In actual practice, the line 20 connecting the parallel-to-serial converter 16 to the cathode ray tube 10 serves as an aerial, thus emitting the radio frequency video signals fed therethrough.

The clock signal emitted by the pixel clock generator 17, the frequency of which is determined by the line frequency of the display unit and the number of display elements per line, is divided in the divider 18 into the character clock frequency, and the pixel clock signal and the character clock signal control the output of the video signal from the parallel-to-serial converter 16. In the display control unit 19, the pixel clock signal is further divided into suitable frequencies for controlling the sweep generator 13.

The video signal on the line 20 contains all the information shown on the screen of the display unit, and this information is repeated every time the electron beam sweeps over the display unit, typically 50–70 times per second. Since the video information is based on characters, it contains more information than is required for the identification of the character at issue. Thus, it is comparatively easy to detect, also at a distance from the display unit, the information contents of the radio frequent signals emitted from, for example, the line 20. These signals may have a frequency spectrum of the type shown in FIG. 2.

To make external detection of the video signals emitted from the line 20 and from other parts of the video signal circuits more difficult, a phantom signal in the form of at least one pseudo-random bit signal sequence with properties similar to those of the video signals may be emitted from the display unit. For this purpose, a second character type memory 15′ and a second parallel-to-serial converter 16′ can be arranged in per se known manner, said memory and converter being controlled by the same signals as the units 15 and 16 and forming a generator for generating the phantom signal. A line 20′ serving as aerial may be connected to the output of the converter 16′.

Figure 2:
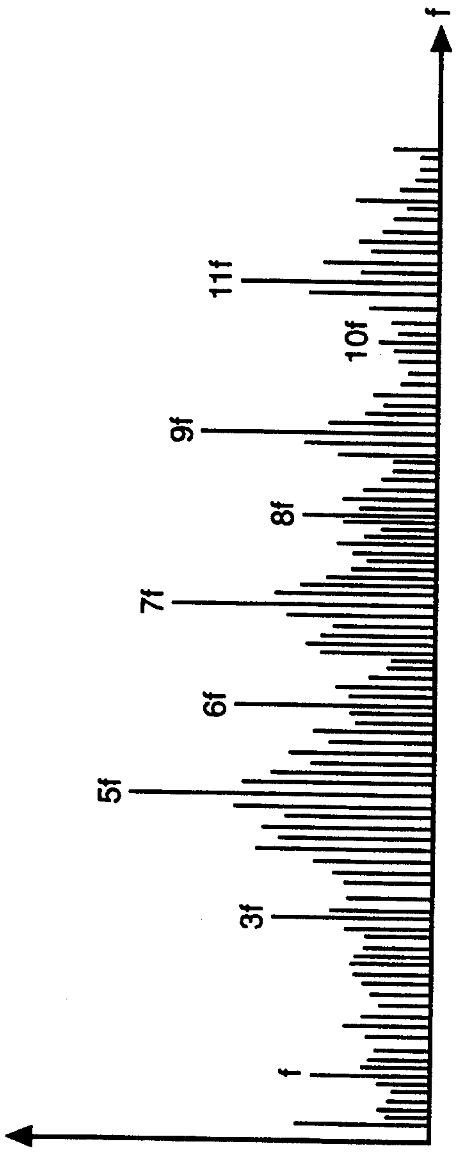
FIG. 2 is a diagram illustrating the frequency spectrum of signals emitted from a conventional display unit.

FIG. 2 shows the relative amplitude at different frequencies of an emitted video signal. The harmonic contents of this spectrum originates from the rapid transitions between the bit levels of the video signal, said transitions being timed by the pixel clock generator 17 which usually is a crystal-controlled oscillator operating in the range of 10–30 MHz. The oscillation frequency of the generator 17 is designated f in FIG. 2, from which it is apparent that the harmonics of this frequency are strong because of the steep flanks between the bits in the video signal. Signal frequencies between the different harmonic frequencies of the frequency f are, inter alia, caused by the modulation occurring in the character frequency.

To make external detection of the information in the signals occurring on the line 20 more difficult, the phantom signal generated by the generator 15′, 16′ is given properties similar to those of the video signals.

Although the above generator is utilised for generating the phantom signal, it has been proven possible to externally detect the information in the video signals occurring in a display unit. According to a first aspect of the invention, such detection can be rendered even more difficult when the phantom signal is also supplied on an external power supply line to the unit containing the video signal circuits, as shown in, for instance, FIG. 3.

Figure 3:
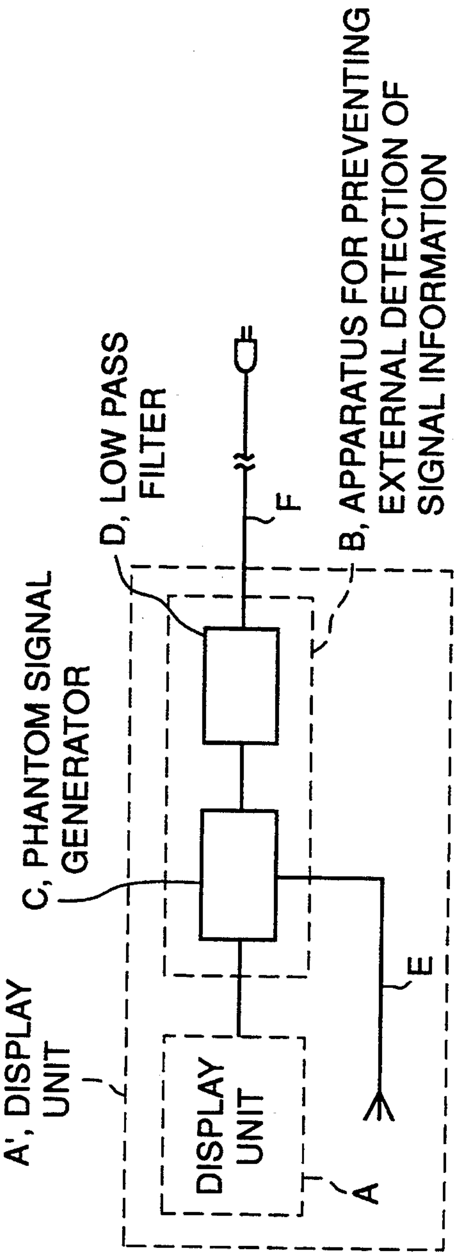
FIG. 3 is a block diagram showing an embodiment of the apparatus according to the invention.

More particularly, FIG. 3 shows the case in which the apparatus according to the invention forms a separate unit connectible to an existing display unit, as well as the case in which the apparatus according to the invention forms part of the display unit, i.e. is incorporated therein as early as at the time of manufacture. In the first case, the display unit is designated A and in the second case it is designated A'. The apparatus according to the invention is designated B. A generator for generating the phantom signal is designated C, a mains filter of low-pass type is designated D, an aerial connected to the generator C is designated E, and a power feed connection for the display unit is designated F.

As is plain from FIG. 3, power is fed to the video signal circuits via the apparatus according to the invention. Thus, the phantom signal generator C is adapted to feed the phantom signal not only to the aerial E, but also to the power feed connection F via the mains filter D. Despite the attenuation of the phantom signal in the mains filter D, the phantom signal can be given a much higher effect than the leaking video signals, via the apparatus B according to the invention, from the video signal circuits to the power supply line F. Thus, the total output to the power supply line F can be rendered smaller or, at the most, about as large as the previous output to this line without the use of the invention.

It should be pointed out that the display unit A normally, when the apparatus B constitutes a separate unit, has its own mains filter which naturally also serves to attenuate the video signals.

Figure 4:
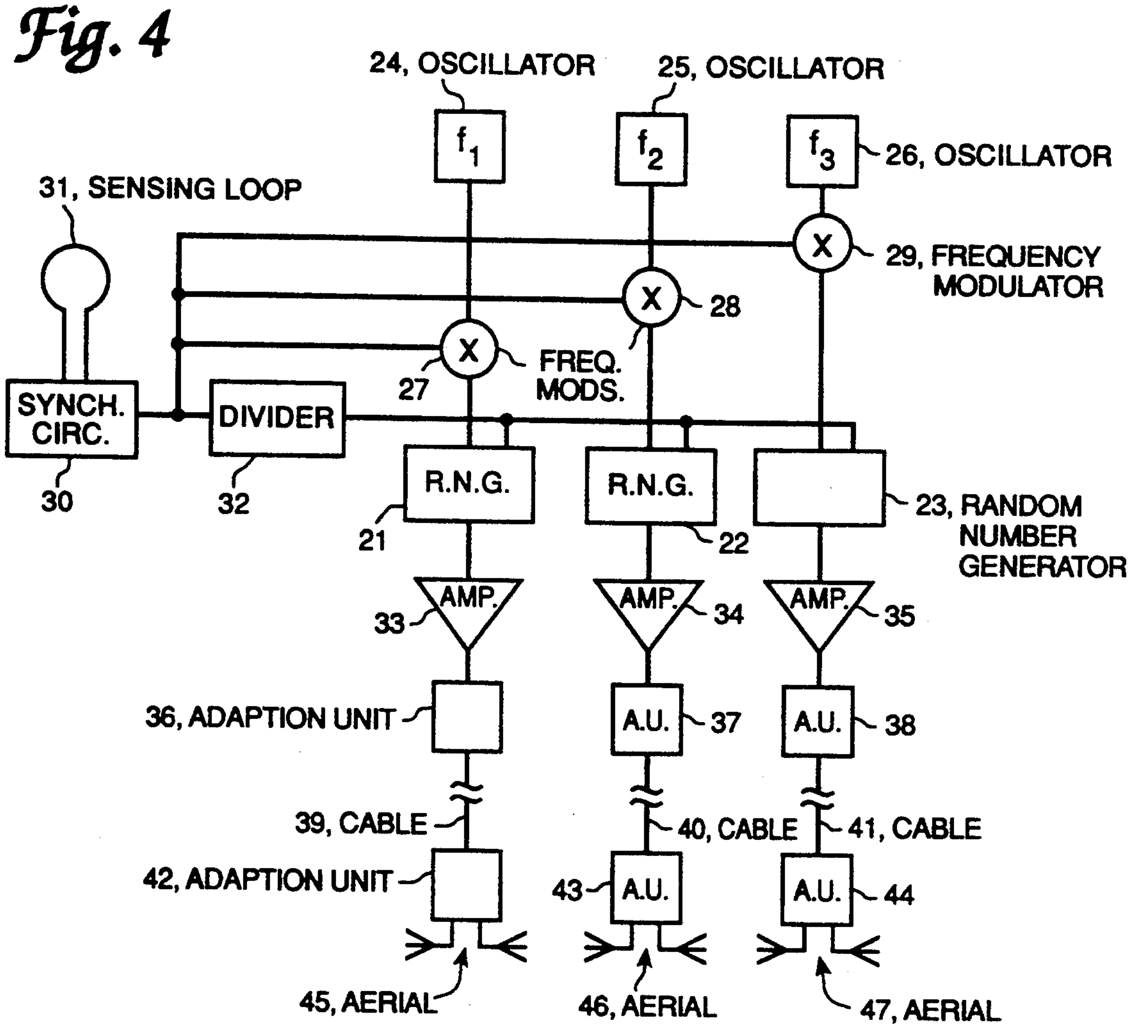
FIG. 4 is a block diagram showing a second embodiment of the apparatus according to the invention.

The embodiment shown in FIG. 4 of the apparatus according to the invention is advantageously combined with the embodiment in FIG. 3 and generates three pseudo-random bit signal sequences with properties similar to those of the video signals. Three random number generators 21–23, each for example consisting of a maximum recurrence length shift register, generate these three pseudo-random bit signal sequences with the bit frequencies f1, f2 and f3, respectively, which are determined by oscillators 24–26 connected to their respective random number generator 21–23 via frequency modulators 27–29. These modulators modulate the output signal from the oscillators 24–26 with a frequency, preferably the line frequency of the display unit, in that they are connected to a synchronisation circuit 30 whose output signal has said line frequency. This is achieved, more precisely, by the use of a sensing loop 31 sensing the signals in the deflection yokes of the cathode ray tube and applying a corresponding voltage to the synchronisation circuit. From this voltage, the synchronisation circuit 30 derives the line frequency and thus feeds a signal of this frequency to the modulation inputs of the modulators 27–29 but also to a divider 32 whose output is connected to the reset inputs of the random number generators 21–23. Via amplifiers 33–35, adaptation units 36–38, cables 39–41, and further adaptation units 42–44, the outputs of the random number generators 21–23 are connected to one aerial 45–47 each.

The oscillation frequencies f1, f2 and f3 should be of the same order of magnitude as the pixel frequency of the video signals, but need not be stable. If the pixel frequency is 30 MHz, the frequencies f1, f2 and f3 may, for example, be 25, 28 and 32 MHz, respectively. Thus, the frequencies of the signals operating the random number generators 21–23 are varied by means of the modulators 27–29, not necessarily with the line frequency of the video signals, but suitably with a frequency of at least about the same order of magnitude.

Due to the frequency variation or modulation, the frequency spectrum of the signals emitted from the aerials 45–47 will no longer be a proper line spectrum, but a more or less continuous spectrum efficiently preventing external detection of the emitted video signals. Furthermore, phase locking against the phantom signal is rendered more difficult for further filtering.

By the frequency division of the line frequency signal from the synchronisation circuit 30, the divider 32 generates a signal synchronised with the frame or field synchronisation signal, whereby the phantom signal will be synchronised with the video signals and thus be repeated with the frame or field period. According to the invention, the phantom signal can be altered from one frame or field period to the next, at the same time as the corresponding video signal is changed. This may, for instance, be achieved because the maximum recurrence length shift registers forming the random number generators 21–23 have adjustable maximum length, the adjustment being optionally controlled from the data register 14.

It should be emphasised that the phantom signal lacks well-defined line and frame synchronisation pulses and thus, due to its irregularity and the fact that it has greater or about the same effect as the video signal, renders considerably more difficult the synchronisation necessary for external detection of the information in the video signal.

It should also be pointed out that the variation or modulation carried out in accordance with the invention of the frequencies of the oscillators 24–26 does not have to be continuous, but may comprise jumps or discontinuities.

Figure 5:
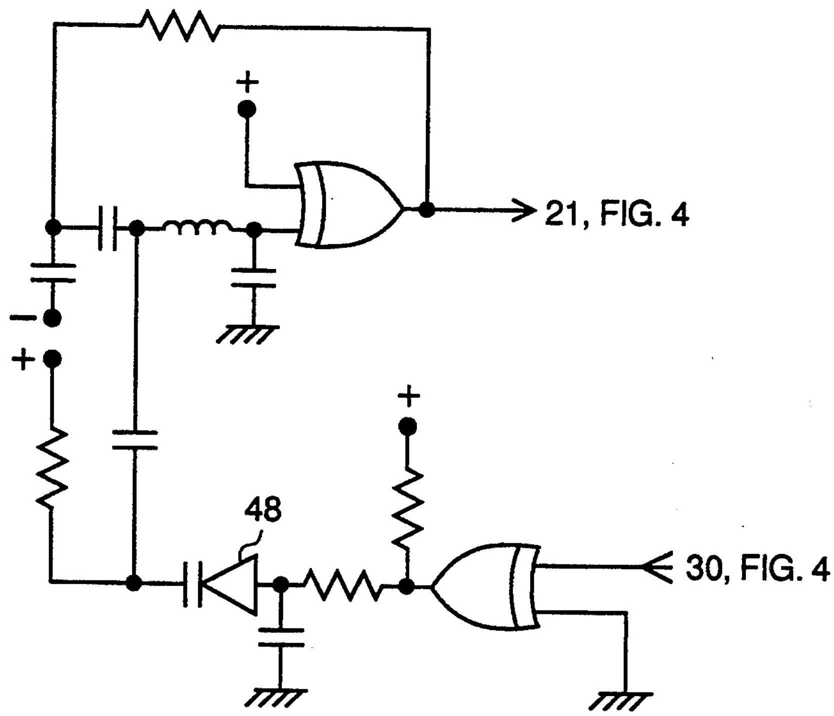
FIG. 5 is a circuit diagram showing an oscillator and a modulator forming part of the apparatus in FIG. 4.

FIG. 5 is a circuit diagram for a combination of, for example, the oscillator 24 and the modulator 27. As is apparent, the circuit is a fairly conventional oscillator circuit comprising a varistor diode 48 whose capacitance in known manner is voltage-dependent and influenced by the signal from the synchronisation circuit 30. The frequency of the output signal from the oscillator shown in FIG. 5 is altered due to the capacitance changes of the varistor diode 48, said output signal being used as clock signal to the random number generator 21.

Figure 6:
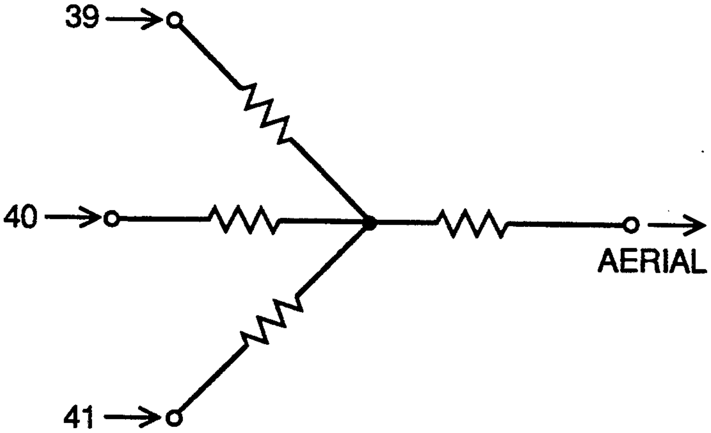
FIG. 6 illustrates schematically the connection of a number of output signals from an apparatus according to the invention.

It is important that the phantom signal be emitted with substantially the same intensity in all directions, thus avoiding making it easier to detect the information in the video signals in any one direction. If there are a number of pseudo-random bit signal sequences, this is more easily achieved with one aerial than with a number of aerials located at a distance from one another, for a circuit combining the pseudo-random bit signal sequences, e.g. a resistance network of the type shown in FIG. 6, may be advantageously connected between the generator and the aerial.

Figure 11:
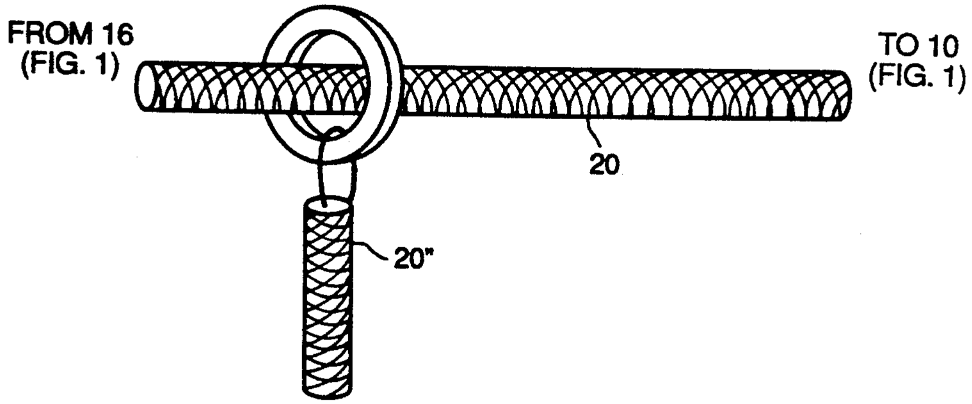
FIG. 11 shows a further aerial arrangement.
Figure 10:
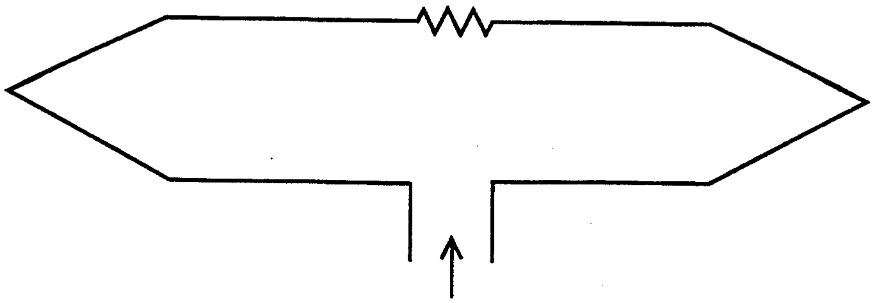
FIG. 10 shows an alternative aerial.

If the apparatus according to the invention forms part of the display unit or another unit containing the video signal circuits, the aerial may advantageously be disposed along the line 20 (FIG. 1), such that the phantom signal is emitted in essentially the same fashion as are the video signals. Thus, one or more conductors can serve as a phantom signal aerial which preferably is located along the video signal-conducting line and advantageously spirally wound round said line. A possible alternative is to use a balanced transmission line of the type shown in FIG. 10, in which case this line is also preferably located along the video signal-conducting line. A further alternative is to use an emitting coaxial line, having openings in the shielding along said line. FIG. 11 illustrates the most advantageous arrangement in which the output signal from the generator C is fed, e.g. via the resistance network in FIG. 6, to a line 20", such as a coaxial cable, one end of which is connected, via a current transformer, to one conductor in the line 20 at the end thereof closest to the converter 16, suitably to the shielding, when the line 20 is a coaxial cable. The current transformer may consist of a ferrite core which encloses the line 20 and through which the ends of the conductors in the line 20" are connected with one another. In this way, the phantom signal uses exactly the same line as the video signal which is to be interfered with.

Figure 7:
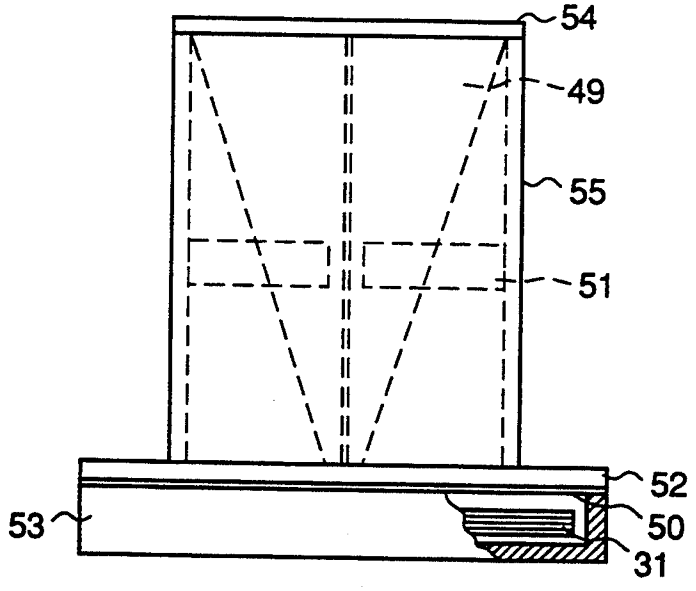
FIGS. 7–9 show a preferred aerial arrangement according to the invention.
Figure 8:
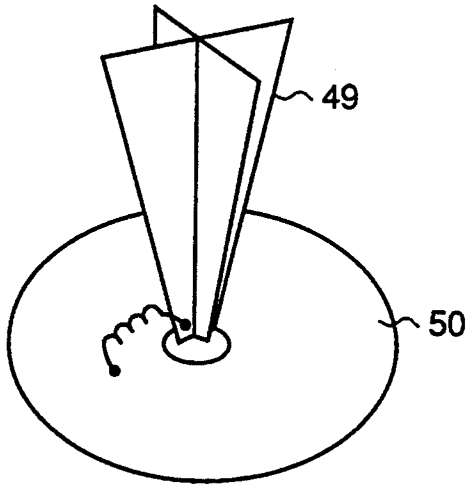
Figure 9:
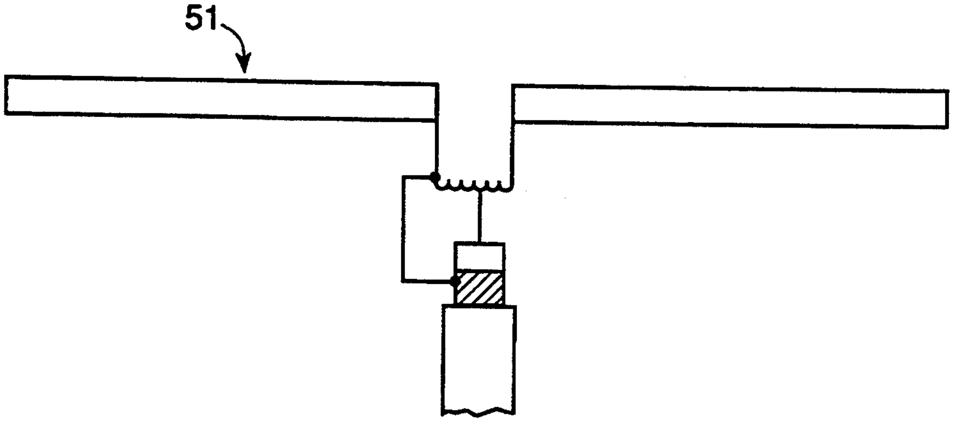

If the apparatus according to the invention forms a separate unit connectible to an existing display unit, or a similar unit, the aerial advantageously is of the type illustrated in FIGS. 7–9. This aerial comprises a first aerial member 49 of copper, which has the form of a broadening fin outwardly projecting from one side of a ground plane 50 and having surfaces perpendicular to one another and to the ground plane 50. The other member, which is shown in FIG. 9, is a conventional dipole 51 and consists of two copper strips. As shown in FIG. 7, these copper strips are arranged circularly around the fin 49 in a plane parallel to the ground plane 50, more precisely on a cylindrical body 55, e.g. a plastic tube. This tube contains the member 49 and is connected with a base plate 52, also made of plastic, on the underside of which the ground plane 50, e.g. in the form of a copper foil, is arranged. As illustrated in FIG. 7, this aerial may be combined with the sensing loop 31 which may be wound on a coil core mounted at a distance under the ground plane 50. A capsule 53 may enclose the sensing loop, and a lid 54 may close the upper end of the tube 55.

The aerial described is advantageous in its simplicity, as well as in its giving a substantially isotropic emission of the phantom signal. Finally, it may, as described above, be combined in a simple manner with the sensing loop 31.

The invention is not restricted to the above embodiments and may be varied within the scope of the appended claims, as is obvious to any one skilled in the art. Thus, the number of random number generators may, for example, be a different one than stated above, and the apparatus may furthermore be composed of units equivalent to those described.

I claim:

1. A method for preventing external detection of signal information in video signals, comprising:
   (a) emitting video signals containing a bit signal sequence, from a video circuit via electromagnetic waves;
   (b) generating a phantom signal with at least one pseudo-random bit signal sequence and having properties similar to said bit signal sequence of said video signals emitted from said video circuit and emitting said phantom signal via electromagnetic waves within a temporally overlapping time interval as said video signals are being emitted; and
   (c) while conducting step (b), supplying said phantom signal to an external power supply line which is powering said video circuit.

2. Apparatus for preventing external detection of signal information in video signals, comprising:
   (a) means for emitting video signals containing a bit signal sequence, from a video circuit via electromagnetic waves;
   (b) means for generating a phantom signal with at least one pseudo-random bit signal sequence and having properties similar to said bit signal sequence of said video signals emitted from said video circuit and emitting said phantom signal via electromagnetic waves within a temporally overlapping time interval and spatially overlapping region as said video signals are being emitted; said means for generating a phantom signal further including a maximum recurrence length shift register with an adjustable maximum length; and
   (c) means for varying bit frequencies of each said pseudo-random bit signal sequence.

3. Apparatus for preventing external detection of signal information in video signals, comprising:
   (a) means for emitting video signals containing a bit signal sequence, from a video circuit via electromagnetic waves including:
      a first aerial having a group plane and a broadening fin projecting outwardly from said ground plane, said broadening fin having surfaces which are perpendicular to one another and to said ground plane; and
      a dipole aerial arranged circularly around said broadening fin, in a plane that is parallel to said ground plane;
   (b) means for generating a phantom signal with at least one pseudo-random bit signal sequence and having properties similar to said bit signal sequence of said video signals emitted from said video circuit and emitting said phantom signal via electromagnetic waves within a temporarily overlapping time interval and spatially overlapping region as said video signals are being emitted; and
   (c) means for varying bit frequencies of each said pseudo-random bit signal sequence.

4. Apparatus for preventing external detection of signal information in video signals, comprising:
   (a) means for emitting video signals containing a bit signal sequence, from a video circuit via electromagnetic waves;
   (b) means for generating a phantom signal with at least one pseudo-random bit signal sequence and having properties similar to said bit signal sequence of said video signals emitted from said video circuit and emitting said phantom signal via electromagnetic waves within a temporally overlapping time interval and spatially overlapping region as said video signals are being emitted;
   (c) means for varying bit frequencies of each said pseudo-random bit signal sequence; and
   a conductor for effectively coupling said means for generating said phantom signal to a video display unit.

5. Apparatus for preventing external detection of signal information in video signals, comprising:

(a) means for emitting video signals containing a bit signal sequence, from a video circuit via electromagnetic waves, and including an external power supply line for powering said video circuit;

(b) means for generating a phantom signal with at least one pseudo-random bit signal sequence and having properties similar to said bit signal sequence of said video signals emitted from said video circuit and emitting said phantom signal within a temporally overlapping time interval as said video signals are being emitted; and (c) means for supplying said phantom signal to said external power supply line.

6. The apparatus of claim 2, wherein:

said means for varying bit frequencies comprises a frequency modulator effectively coupled to said means for generating a phantom signal.

7. The apparatus of claim 6, wherein:

said means for generating a phantom signal includes means for providing at least one said pseudo-random bit signal sequence with a plurality of partial pseudo-random bit signal sequences which are varied in duration from one said frame period to another said frame period, or from one said field period to another.

8. The apparatus of claim 7, wherein:

said means for generating a phantom signal further includes a maximum recurrence length shift register with an adjustable maximum length.

9. The apparatus of claim 2, wherein:

said means for emitting said video signals and said means for emitting said phantom signal include:

a first aerial having a ground plane and a broadening fin projecting outwardly from said ground plane, said broadening fin having surfaces which are perpendicular to one another and to said ground plane; and a dipole aerial arranged circularly around said broadening fin, in a plane that is parallel to said ground plane.

10. The apparatus of claim 9, further including:

a conductor for effectively coupling said means for generating said phantom signal to a video display unit.

11. The apparatus of claim 10, wherein:

said video signal has a given line frequency within said time interval, and said means for varying bit frequencies of each said pseudo-random bit signal sequence includes means for causing said bit frequencies to vary at a magnitude which is substantially equal to that of said line frequency.

12. The apparatus of claim 11, wherein:

said video signal has a given line frequency within said time interval, and said means for varying bit frequencies of each said pseudo-random bit signal sequence includes means for causing said bit frequencies to vary at a magnitude which is substantially the same as that of said given line frequency.

13. The apparatus of claim 12, wherein:

said video signal has a given frame period or a given field period within said time interval and an ensemble average differing from zero, and said means for varying bit frequencies of each said pseudo-random bit signal sequence forms that pseudo-random bit signal sequence from a plurality of partial pseudo-random bit signal sequences, each of which is varied within each said frame period or field period.

14. The apparatus of claim 13 further comprising:

a video display unit effectively connected by said conductor, to said means for generating said phantom signal.

* * * * *